US005327646A

United States Patent [19]

Harmand

[11] Patent Number: 5,327,646

[45] Date of Patent: Jul. 12, 1994

[54] REMOVAL/REPLACEMENT OF ENGINE VALVE SPRINGS

[76] Inventor: Brice Harmand, 600 Front St. #435, San Diego, Calif. 92101-6737

[21] Appl. No.: 71,597

[22] Filed: Jun. 2, 1993

Related U.S. Application Data

[63] Continuation of Ser. No. 915,018, Jul. 16, 1992, abandoned, which is a continuation-in-part of Ser. No. 855,098, Mar. 20, 1992, abandoned.

[51] Int. Cl.$^5$ .............................................. B23P 19/04

[52] U.S. Cl. .................................. 29/888.42; 29/215; 29/216; 29/402.03; 29/426.5

[58] Field of Search .................. 29/213.1, 252, 402.03, 29/402.08, 404, 426.1, 426.5, 888.01, 888.011, 888.42, 890.121, 890.124, 215, 281.1

[56] References Cited

U.S. PATENT DOCUMENTS 1,898,720 2/1933 Elder ................................ 29/213.1
4,562,629 1/1986 Cerio ................................ 29/888.42
4,574,620 3/1986 Cohl ................................ 73/49.7 X
4,787,130 11/1988 Hale et al. ........................ 29/252 X
5,117,864 6/1992 Byers .......................... 29/888.011 X
5,241,747 9/1993 Harmand .......................... 29/888.42

*Primary Examiner*—Mark Rosenbaum
*Assistant Examiner*—S. Thomas Hughes
*Attorney, Agent, or Firm*—Brown, Martin, Haller & McClain

[57] ABSTRACT

The detached cylinder head is placed on a table or other flat surface which has a recessed area within which is retained a deformable elastic bladder. Air, water or some other fluid is introduced into the bladder causing it to expand so that it conforms to the chambers within the cylinder head. The pressure of the expanded bladder within the chamber forces the valve upward against the valve seat. Once the valve is pressed upward against the valve seat, the valve can be disassembled by depressing the spring and removing the fastener, so that the spring can be removed, or the spring can be put in place and the valve reconnected.

17 Claims, 2 Drawing Sheets

REMOVAL/REPLACEMENT OF ENGINE VALVE SPRINGS

CROSS-REFERENCES TO RELATED APPLICATIONS

This application is a continuation of application Ser. No. 07/915,018, filed Jul. 16, 1992, and now abandoned, which is continuation-in-part of application Ser. No. 07/855,098, filed Mar. 20, 1992 and now abandoned.

BACKGROUND OF THE INVENTION

The overhaul of internal combustion engines is an expensive, difficult and time-consuming process. Virtually all internal combustion engines include valves which are operated against spring pressure, and there are at least two valves for each cylinder. Thus, in order to disassemble and reassemble the engine, and specifically the cylinder head, means must be provided to manipulate the valves so that the springs can be removed or attached. These springs are fairly stiff and require a considerable amount of force to be applied to the valve by way of a specialized clamp. This clamp spans a portion of the cylinder head so that it reaches both the valve face and the spring, simultaneously lifting the valve and compressing the spring. Since engines are configured in many different ways, valve locations can vary so that a clamp is required for each type of engine to be serviced, and different valves within a single engine introduce further variables and requirements due to the shape of the engine. This can result in considerable expense to a mechanic just to have one clamp for each valve arrangement. Further, if the mechanic only has one clamp for a particular valve arrangement, the valves must be disassembled/reassembled serially, making the procedure tedious and time consuming. Thus, duplicate tools may be required. The added tool and labor costs contribute to the time and expense involved in an engine overhaul. Also, the application of a tool directly to the valve face may damage or bend the valve.

U.S. Pat. No. 4,562,649 of Cerlo discloses a balloon at the end of a wand which can be inserted into the spark plug hole in the cylinder head. Inflation of the balloon presses the valve outward. While this procedure provides some time savings in that it doesn't require removal of the cylinder head from the block, it does require specialized tools which may be unreliable. Also, it is very rare that work is done on engine valves without removing the cylinder head, so the applications of Cerlo's method are limited.

The cost of automobiles has increased dramatically in recent years such that car owners tend to keep their cars longer. This will result in greater demand for engine overhauls. A time and cost saving apparatus and procedure for facilitating engine disassembly and assembly would be desirable to make such service easier and more affordable. It is to such an apparatus and method that the present invention is directed.

SUMMARY OF THE INVENTION

It is an advantage of the present invention to provide an apparatus and method which facilitate disassembly/reassembly of valves in a cylinder head which is applicable to all engine configurations without requiring specialized tools for each configuration.

It is another advantage of the present invention to provide an apparatus and method which allows simultaneous presentation of all valves for disassembly/reassembly.

In an exemplary embodiment, the detached cylinder head is placed on a table or other flat surface which is covered with a layer of rubber or rubber-like material which can produce an airtight seal between the cylinder head and the flat surface. Downward pressure may be applied, as an option, by clamping or tying the cylinder head to the flat surface. Compressed air is introduced into the spark plug hole by inserting a connector adapted to provide an airtight seal with the spark plug hole of a gasoline engine or injector hole of a diesel engine. The uniform pressure of the compressed air on the valve face forces the valve upward against the valve seat, resulting in a pressured, airtight chamber. Once the valve is pressed upward against the valve seat, the valve can be disassembled by depressing the spring and removing the fastener, so that the spring can be removed, or the spring can be put in place and the valve reconnected. In this embodiment, the reassembled cylinder head can be tested to determine the quality of the seal between the valve and valve seat by closing a valve which allows compressed air to enter the chamber and measuring the pressure drop with time as indicated by a gauge in the air line. A single air line can be provided with the presentation (lifting) of valves for disassembly/reassembly being done serially, or multiple air lines can be provided which the appropriate fitting in each spark plug/injector hole to present all the valves at one time.

In some situations, for example, where the chamber is particularly large, the pressures used for the above procedure, typically 2 to 3 kg/cm$^2$, may be insufficient to lift the valves within the chamber. In this case, the table top is fitted with a deformable elastic bladder or membrane. The bladder is filled with air, water, or some other fluid after the cylinder head is placed on the table so that the bladder expands to substantially fill the inner volume of the chamber, providing force to push the valves outward. The bladder pushes the valves with sufficient force to achieve the desired result, but does not damage the valves in any way. The bladder also acts as a shock absorber to absorb the force resulting from the use of a hand-held hammer to release the key-bolts around the tip of the valve. Finally, the bladder pushes and holds the valves in the proper position for reassembly.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

Figure 3:
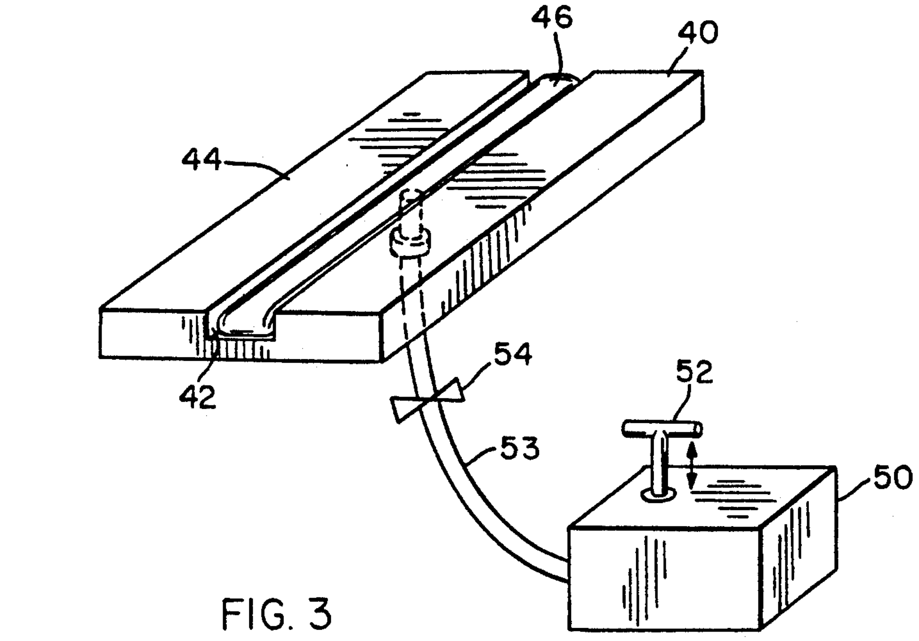
Figure 4:
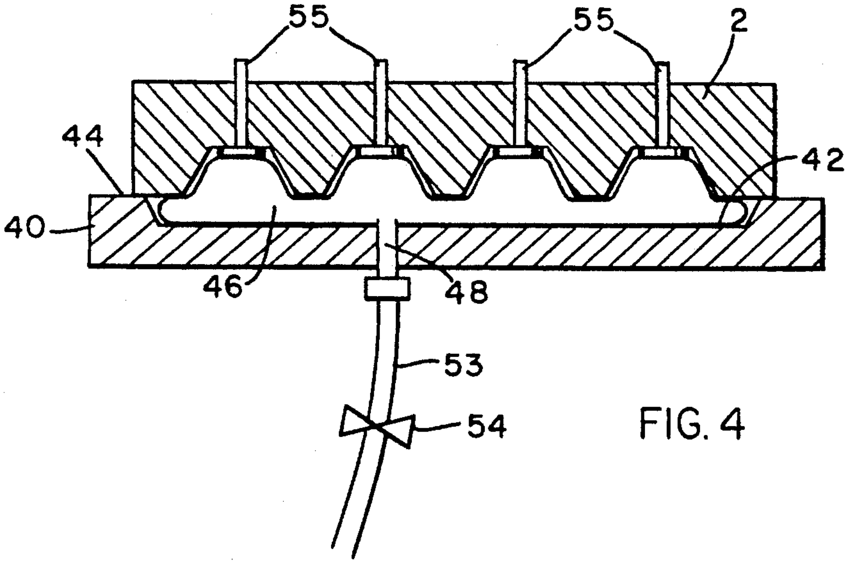

FIGS. *2a* and *2b* are cut-away views of a chamber of a cylinder head illustrating, respectively, before and after introduction of compressed air into the chamber;

FIG. 3 is a diagrammatic view of an alternate embodiment of the apparatus of the present invention with a deformable bladder; and FIG. 4 is a cut-away view of the cylinder head on the apparatus of FIG. 3.

DETAILED DESCRIPTION OF THE PREFERRED EMBODIMENTS

Figure 1:
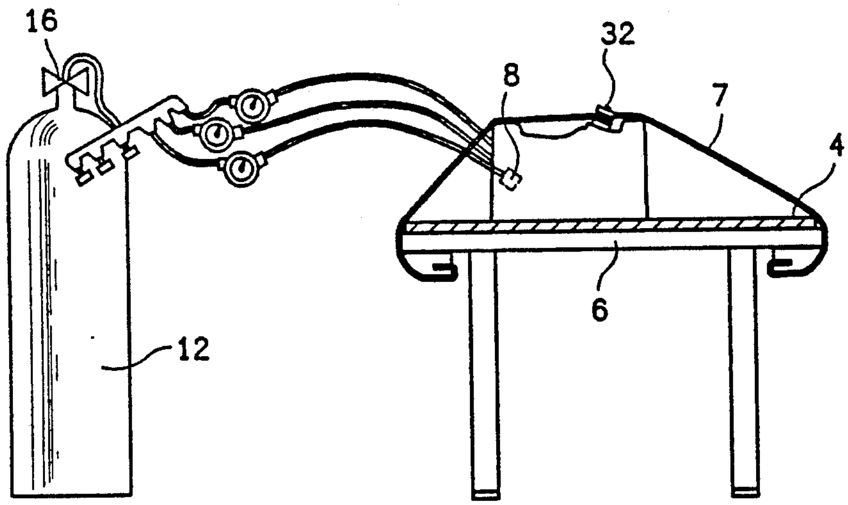
FIG. 1 is a diagrammatic view of the apparatus of the present invention in use on an exemplary cylinder head.

As illustrated in FIG. 1, cylinder head 2 is placed in sealing surface 4 after disassembly from the engine block. Sealing surface 4 is supported, either attached or unattached to flat surface 6 which may be a table bench or similar surface. Sealing surface 4 is a resilient, deformable material which is relatively non-porous, such as rubber or rubber-like material which can form a substantially airtight seal. Where the weight of the cylinder head is insufficient to hold the cylinder head against the sealing surface when compressed air is introduced, a clamping device may be provided in the form of a clamp, tie-down straps, elastic cords or similar functioning means. Connector 8 is attached to each air line 10 which is connected to a compressed gas source 12. Source 12 is preferably a cylinder of compressed air or non-volatile gas, but may also be a compressor. A pressure gauge 14 and a shut-off valve 16 are provided to control input air pressure and measure back-pressure. For serial operation, only a single line 10 and connector 8 combination is required. For greater efficiency of effort, multiple lines and connectors are provided, as illustrated, to present multiple valve stems 32 for disassembly or reassembly.

Connector 8 is inserted into the spark plug hole 24 (or injector hole) and held in place by either a snap-in or screw-in type fastener, or any other type of fastener which provides a substantially airtight seal and can withstand the increased pressures created within the chamber 26.

Figure 2A:
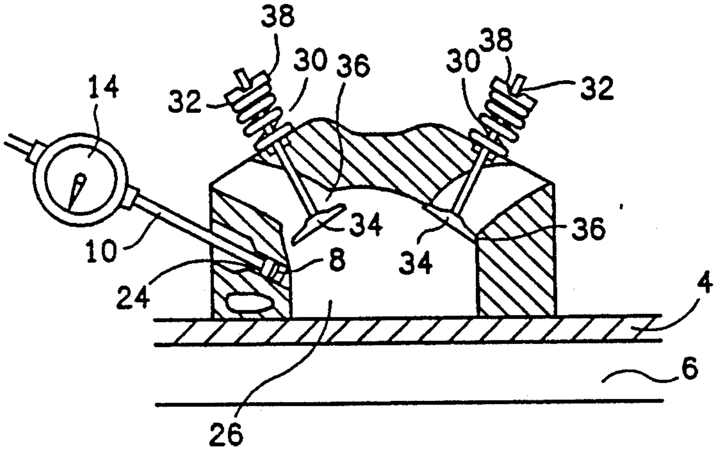
Figure 2B:
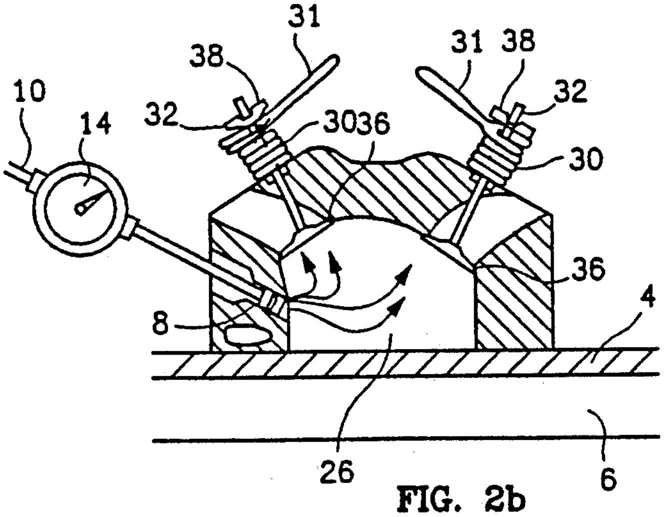

FIGS. 2*a* and 2*b* illustrate the operation of the inventive method. Prior to introduction of the compressed air into chamber 26, the springs 30 are expanded and the end of valve stem 32 is not readily accessible for removal of the spring 30. The valve head 34 may or may not be in contact with valve seat 36. Compressed air, typically at pressures of 2 to 3 kg/cm$^2$, is introduced into chamber 26 driving the valve head 34 against valve seat 36 with a force proportional to the valve head area times the pressure. Compression of the spring 30 by a wrench 31 or similar tool does not force the valve into the chamber 26 due to the pressure in the chamber, allowing the spring 30 to move sufficiently independent of the valve to allow valve stem 32 to be more readily accessible for removal of the spring 30 and corresponding fastener (key bolt) 38. After key bolt 38 is removed, the pressure forces the valve head 34 against the valve seat 36 for reassembly, valve stem 32 is made more accessible for placement of the spring 30 and the fasteners 38 as a result of the outward pressure on the valve.

The uniform force on the valve head 34 provided by the air pressure avoids damaging or bending the valve, which can occur when a tool is directly in contact with the valve head.

After assembly, the air tightness between the coupled valve and the valve seat can be evaluated and adjusted by isolating the air flow with a shut-off valve 16 or tap. Gauge 14 is located between shut-off valve 16 and the chamber 26. Back-pressure from the chamber is monitored at pressure gauge 14 to determine a leak-back rate. Tables may be generated to provide a standard of equivalency between leak-back rate and seal quality, or the leak-back rate can be monitored and the valves adjusted so that all valves in the engine have the same leak-back rate to assure uniform response in each chamber without requiring a quantitative measurement.

The above-described embodiment provides sufficient force to lift the valves in most cases. However, for some engine configurations, the chamber volume is of such a size that excessive pressure must be applied to fill the chamber sufficiently to overcome the compressive force of the valve springs.

For situations in which the air pressure alone is insufficient, a deformable elastic bladder or membrane is fitted into the table. The bladder is inflated with air, water, or some other fluid after the cylinder head is placed on the table so that the bladder expands to fill the inner volume of the chamber, pushing the valve face outward.

As illustrated in FIGS. 3 and 4, the table 40 has a groove 42, or other recessed area, bisecting the top surface 44 of the table. The cylinder head 2 is positioned so that its chambers are aligned with groove 42. A bladder 46 is retained within groove 42, and a stem 48 extends from the table 40 to permit the desired fluid to be introduced. If water or some other liquid is used, bladder 46 can be part of a closed system in which a pump 52 forces the liquid through line 53 and stem 48 into the bladder 46, after which shut-off valve 54 is closed, and the fluid may be stored in a tank 50. Pump 52, while illustrated as a plunger-type hand pump, can be any other type of hand pump, an electromechanical pump or a compressed air or gas source. Liquids are much less compressible than gases and simply by filling the bladder 46, sufficient force is available to push valve 55 outward without requiring application of a great deal of pumping pressure.

If air or another gas is used, it can be supplied by a pump or compressed source to fill the bladder 46. After the valve work is completed, the gas can be vented by a secondary valve, or a three-way valve can be used for shut-off valve 54.

The bladder 46 is a durable and elastic material, such as, but not limited to, latex or rubber, and should be strong enough to resist punctures. Since the bladder 46 preferably lies completely within groove 42 it is less susceptible to pinching or damage which might occur while the cylinder head is being positioned on the working surface. Nonetheless, the bladder 46 must be able to press against edges and corners within the chamber without being damaged, while still being sufficiently deformable to fill the chamber so that it substantially conforms to its volume. The bladder 46 provides a uniform force against the valve face, sufficient to compress the spring, but without risk of damage that might occur with tools applied directly to the valve face. The bladder 46 also absorbs the force resulting from hitting the tip of the valve with a hammer to release the key-bolts. Finally, the bladder pushes and holds the valve in the correct position for reassembly.

The apparatus of the present invention involves readily available components which are universally adaptable to virtually all motor vehicle engines. The use of a resting surface on which the cylinder head is placed enhances the ease of the task when compared with the requirements under present practices of frequently manipulating the cylinder head to permit simultaneous access to the upper and lower portions of the cylinder head. The invention method permits disassembly, reassembly and, in one embodiment, testing using the same equipment without requiring movement of the cylinder head. This improves time efficiency, thus reducing labor costs.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method for improving access for removal or replacement of at least one valve spring in a cylinder head having a plurality of chambers with a corresponding plurality of valves when said cylinder head is disassembled from an engine block, the method which comprises:

disposing a deformable bladder within a flat surface, said deformable bladder having a length sufficient to span said plurality of chambers;

placing said cylinder head against said flat surface so that said plurality of chambers is positioned over said deformable bladder; and filling said deformable bladder with a fluid so that said deformable bladder expands to fill said plurality of chambers thereby forcing at least one valve within each chamber outward so that said at least one valve is disposed in a position to facilitate removal or replacement of said at least one valve spring.

2. A method as in claim 1 wherein the step of disposing a deformable bladder within a flat surface comprises forming a recessed area within said flat surface and disposing said deformable bladder within said recessed area.

3. A method as in claim 1 wherein the step of filling said deformable bladder comprises pumping liquid into said deformable bladder.

4. A method as in claim 1 wherein the step of filling said deformable bladder comprises pumping air into said deformable bladder.

5. A method as in claim 1 further comprising sealing said deformable bladder after filling so that said fluid remains in said deformable bladder until it is released.

6. A method as in claim 5 wherein said fluid is returned to a storage tank after it is released from said deformable bladder.

7. A method for improving access to valve springs on valves within a cylinder head having a plurality of chambers so that at least one of said valve springs can be removed from its corresponding valve or replaced on its corresponding valve when said cylinder head is disassembled from an engine block, the method which comprises:

disposing a sealing means on a surface, said sealing means having a length which spans said plurality of chambers;

placing said cylinder head against said flat surface adjacent said sealing means so that said plurality of chambers abuts said sealing means; and introducing a fluid into said plurality of chambers thereby forcing at least one valve within each chamber outward so that said at least one valve is disposed in a position to facilitate removal or replacement of its corresponding valve spring.

8. A method as in claim 7 wherein the step of disposing a sealing means comprises affixing a deformable sealing pad on said flat surface.

9. A method as in claim 8 wherein the step of introducing a fluid comprises introducing compressed air into said plurality of chambers wherein said sealing means creates a substantially airtight seal of said plurality of chambers.

10. A method as in claim 7 wherein the step of disposing a sealing means comprises positioning a deformable bladder within a channel in said flat surface.

11. A method as in claim 10 wherein the step of introducing a fluid comprises pumping said fluid into said deformable bladder causing said deformable bladder to expand within said plurality of chambers.

12. A method for improving access for removal or replacement of at least one valve spring in a cylinder head having a plurality of chambers and a plurality of corresponding valves when said cylinder head is disassembled from an engine block, wherein said at least one valve spring is disposed on a stem of a corresponding valve, held in place by a key bolt, the method which comprises:

disposing a deformable bladder within a channel which generally bisects a flat surface, said deformable bladder having a length which spans said plurality of chambers;

clamping said cylinder head onto said flat surface so that said plurality of chambers are positioned over said deformable bladder;

filling said deformable bladder within a fluid so that at least a portion of said deformable bladder expands to fill said plurality of chambers, wherein each valve of said corresponding plurality of valves is forced outward so that said at least one valve is disposed in a position to facilitate removal or replacement of said at least one valve spring by allowing compression of said at least one valve spring to provide access to said key bolt.

13. A method as in claim 12 wherein the step of filling said deformable bladder comprises pumping liquid into said deformable bladder.

14. A method as in claim 12 wherein the step of filling said deformable bladder comprises pumping air into said deformable bladder.

15. A method as in claim 12 further comprises sealing said deformable bladder after filling so that said remains in said deformable bladder until it is released.

16. A method as in claim 12 further comprising releasing said fluid from said deformable bladder after a desired work on said valve spring is accomplished.

17. A method as in claim 16 wherein the step of releasing said fluid includes returning said fluid to a storage tank.

* * * * *

UNITED STATES PATENT AND TRADEMARK OFFICE

CERTIFICATE OF CORRECTION

PATENT NO. : 5,327,646

DATED : July 12, 1994

INVENTOR(S) : BRICE HARMAND

It is certified that error appears in the above-indentified patent and that said Letters Patent is hereby corrected as shown below:

- COLUMN 6, CLAIM 12, LINE 34, DELETE "WITHIN" AND INSERT --WITH--;
- COLUMN 6, CLAIM 15, LINE 50, AFTER "SAID" (SECOND OCCURRENCE) INSERT --FLUID--.

Signed and Sealed this

Twenty-eight Day of February, 1995

Attest:

BRUCE LEHMAN

*Attesting Officer* *Commissioner of Patents and Trademarks*